United States Patent
Cheriton

(10) Patent No.: US 9,798,630 B2
(45) Date of Patent: Oct. 24, 2017

(54) HARDWARE-SUPPORTED MEMORY TEMPORAL COPY

(71) Applicant: Intel Corporation, Santa Clara, CA (US)

(72) Inventor: David R. Cheriton, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 639 days.

(21) Appl. No.: 14/178,038

(22) Filed: Feb. 11, 2014

(65) Prior Publication Data

US 2014/0258660 A1 Sep. 11, 2014

Related U.S. Application Data

(60) Provisional application No. 61/775,041, filed on Mar. 8, 2013.

(51) Int. Cl.
*G06F 11/14* (2006.01)
*G06F 17/30* (2006.01)

(52) U.S. Cl.
CPC ........ *G06F 11/1471* (2013.01); *G06F 11/141* (2013.01); *G06F 17/30371* (2013.01); *G06F 2201/80* (2013.01); *G06F 2201/82* (2013.01)

(58) Field of Classification Search
None
See application file for complete search history.

(56) References Cited

U.S. PATENT DOCUMENTS

| 7,650,460 | B2 | 1/2010 | Cheriton | |
|---|---|---|---|---|
| 9,208,082 | B1 * | 12/2015 | Cheriton | G06F 12/06 |
| 2004/0044872 | A1 * | 3/2004 | Scott | G06F 12/0284 711/202 |
| 2005/0015563 | A1 * | 1/2005 | Yang | G06F 17/30371 711/170 |
| 2007/0083722 | A1 * | 4/2007 | Per | G06F 11/1451 711/162 |
| 2007/0168707 | A1 * | 7/2007 | Kern | G06F 11/1435 714/6.12 |

(Continued)

FOREIGN PATENT DOCUMENTS

| CA | 2382712 A1 | 10/2003 |
|---|---|---|
| CN | 1162785 A | 10/1997 |

(Continued)

OTHER PUBLICATIONS

Chinese First Office Action mailed Oct. 19, 2016, corresponding Chinese Patent Application No. 201410077796.0, 24 pages.

(Continued)

*Primary Examiner* — Henry Tsai
*Assistant Examiner* — Christopher Bartels
(74) *Attorney, Agent, or Firm* — Schwabe, Williamson & Wyatt, P.C.

(57) ABSTRACT

Providing a snapshot of a physical memory region as of a specified time includes: sending, from a first processor to a second processor, a request to generate a snapshot of the physical memory region as of the specified time; and generating, using the second processor, the snapshot of the physical memory region based at least in part on a known state of the physical memory region and log information about update activity of the physical memory region.

25 Claims, 8 Drawing Sheets

FIG. 3

(56) References Cited

U.S. PATENT DOCUMENTS

| | | | |
|---|---|---|---|
| 2009/0070520 A1* | 3/2009 | Mizushima | G06F 12/0246 |
| | | | 711/103 |
| 2009/0177850 A1* | 7/2009 | Boyd | G06F 3/0623 |
| | | | 711/155 |
| 2011/0072207 A1* | 3/2011 | Jin | G06F 17/30368 |
| | | | 711/112 |
| 2012/0317074 A1 | 12/2012 | Ngo | |
| 2013/0006938 A1 | 1/2013 | Prahlad | |

FOREIGN PATENT DOCUMENTS

| | | | |
|---|---|---|---|
| CN | 1629817 A | 6/2005 | |
| CN | 1842789 A | 10/2006 | |
| CN | 101258491 A | 9/2008 | |
| CN | 101436207 A | 5/2009 | |
| CN | 102053876 A | 5/2011 | |
| CN | 102906743 A | 1/2013 | |

OTHER PUBLICATIONS

Non-Final Office Action mailed Nov. 23, 2015, issued in corresponding U.S. Appl. No. 14/178,130.
Notice of Allowance mailed Jun. 15, 2016, issued in corresponding U.S. Appl. No. 14/178,130.
Chinese First Office Action mailed Aug. 2, 2016, corresponding Chinese Patent Application No. 201410077960.8.
2nd Chinese First Office Action dated Mar. 31, 2017, issued in corresponding Chinese Patent Application No. 01410077960.8, 19 pages.
2nd Chinese Office Action dated May 10, 2017, corresponding Chinese Patent Application No. 201410077796.0, 24 pages.

* cited by examiner

HARDWARE-SUPPORTED MEMORY TEMPORAL COPY

CROSS REFERENCE TO OTHER APPLICATIONS

This application claims priority to U.S. Provisional Patent Application No. 61/775,041 entitled HARDWARE-SUPPORTED MEMORY TEMPORAL COPY AND LOGGING filed Mar. 8, 2013 which is incorporated herein by reference for all purposes.

BACKGROUND OF THE INVENTION

A common requirement for database systems is the ability to provide a snapshot (i.e., a copy) of the database at a specified point in time. In particular, the "consistent read" capability of many databases requires providing the ability to run a query against the committed state of specific data (e.g., a database) at a specified point in time. A common case is at the time corresponding to the start of this query processing. Other times are possible and generally need to be supported. For example, a query may select the gold customers with more than 1 million dollars in orders as of close of business yesterday. Additional requirements include the abilities to recover the committed state of the database on a failure, and to provide time series data about a dataset (i.e. its changes in value over time).

Typically, consistent read and recovery functions are implemented in software. Existing implementations often result in memory-intensive operations that negatively impact the performance of the processor caches because these operations bring extra data (e.g., log data and/or metadata) into the processor caches. In particular, the processing is often stalled waiting for the data from the main memory, and other data that is relevant to the on-going processing may be evicted from the processor cache to provide space for the extra data.

Moreover, under increased load, it is common for a transaction to require a consistent read of a block of data that has been modified since the start of the query, thus incurring the cost of rolling back the current state to the time the query was started. These costs tend to increase with increasing load on the system, leading to non-graceful degradation.

The typical software implementation of consistent read and recovery functions further suffers from synchronization overhead with other processor cores running on the same system, as it is necessary to access the data structures of the log and buffer pool concurrently with other processor cores in the system. This synchronization is effectively additional inter-core cache traffic, further reducing the performance of each core as well as the overall system performance.

The typical software implementation of consistent read and recovery functions relies on undo and redo logs. The same issue mentioned above arises with a software implementation of writing to undo and redo logs on database update because the processor core needs to access metadata and data and synchronization frequently. In particular, to add an undo record to the undo log and a redo record to the redo log as part of recording an update in a transaction, the processor needs to access the data corresponding to the end of undo log as well as data corresponding to the end of the redo log, and then perform writes to both. The updating process must also access any ancillary/management data structures associated with these logs as well as the code segments storing the instructions for performing these actions. It also needs to synchronize with other processor cores to perform updates on these logs. Performance is therefore negatively impacted.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Hardware-supported temporal copying and logging of memory is described. In some embodiments, a hardware component that is separate from the central processing unit is used to provide the hardware support. In various embodiments, to support temporal copying, a snapshot is generated based on known memory state and log information. In various embodiments, the log information is determined based at least in part on an indirect representation of memory.

Figure 1A:
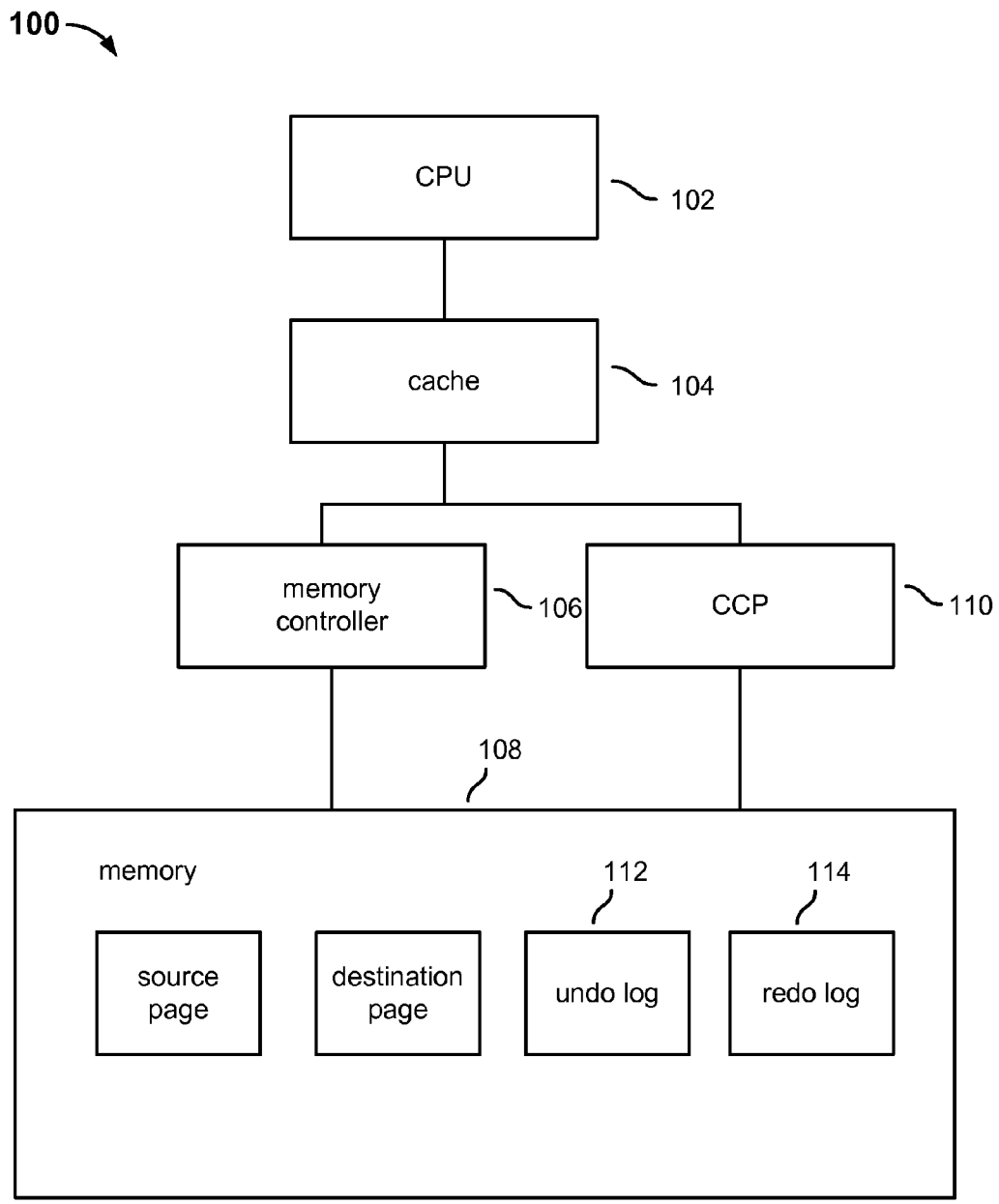
FIG. 1A is a block diagram illustrating an embodiment of a system configured to provide hardware-supported temporal copy of memory.

FIG. 1A is a block diagram illustrating an embodiment of a system configured to provide hardware-supported temporal copying of memory.

System 100 includes one or more central processing units (CPUs, also referred to as application processors or processors) 102 configured to execute program instructions, one or more caches 104 configured to provide temporary, low latency memory to CPU 102, and a main memory 108 configured to provide instructions and data to CPU 102. Main memory 108 typically has greater capacity and higher latency than cache 104. In some embodiments, the cache is implemented using static random-access memory (SRAM) and the main memory is implemented using dynamic random-access memory (DRAM). Other implementations are possible. In addition, the system can have secondary storage such as disks.

Copies of frequently used data are stored in cache 104. When CPU 102 needs data (e.g., when an application requests a particular piece of data from a database), cache 104 is checked first. If the data is not found in cache 104, a cache miss occurs and main memory 108 is checked to locate the data.

In this example, a memory controller 106 is configured to manage the flow of data (including instructions) to and from main memory 108, facilitating the access of main memory 108 by CPU 102. Memory controller 106 is implemented as a module that is separate from CPU 102, and the two components do not necessarily directly communicate with each other (in other words, they do not necessarily have direct interfaces or connections). Memory controller 106 and CPU 102 can exchange data via cache 104.

A copy coprocessor (CCP) 110 is configured to cooperate with the CPU to support consistent read and logging functions. As will be described in greater detail below, CCP 110 is configured to perform actions such as copying data and providing snapshots. CCP 110 is considered a hardware component that is separate from CPU 102. The CCP does not necessarily have direct connections (e.g., interfaces, buses) with the CPU. In some embodiments, the CCP and the CPU are implemented on separate chips or circuits. In various embodiments, CCP 110 interacts with CPU 102 by sending data to and from memory controller 106 and/or cache 104. In some embodiments, CCP 110 is implemented as a component separate from the memory controller, and the two components communicate with each other via communication interfaces. In some embodiments, CCP 110 is integrated with memory controller 106 as part of the memory controller's circuitry.

Data (such as a database or other collection of data) is stored in main memory 108. In some embodiments, a certain memory region is designated as being logged. For example, the operating system may set one or more configuration registers to specify the address and size of a memory region being logged. Writes to the memory region are logged. In this example, an undo log 112 and a redo log 114 are maintained in main memory 108 by CCP 110. For a specific memory region (e.g., a page of memory at a specific address), the redo log includes the updates that have been performed, i.e., the new values since the last checkpoint. The undo log includes the values that have been overwritten by these updates, i.e., the old values, since the last checkpoint.

In some systems, data is committed frequently, but is less frequently saved to a backing store (e.g., writing to persistent data storage such as a disk) at certain checkpoints. The redo log allows the committed state to be recovered after a failure by reading from a backing store a snapshot of the data state at a checkpoint that corresponds to an earlier time, and then applying the committed updates in the redo log to the checkpoint state to bring the data state forward in time to the last committed and logged state. Thus, the redo log allows the system to avoid the cost of having to write out in-place updates to persistent store on every commit while still allowing recovery from loss of memory state.

The undo log is used to provide the state of the data at an earlier time by applying entries of the undo log in reverse order to a later time copy of the state until the state has been "undone" back to its state at the specified time. A common case of this "later time" is the current time, in which case the known state corresponds to the current state of the database. The undo log facilitates the implementation of atomic transactions (an atomic transaction includes a set of write operations that must be committed together or not at all), since conflicts resulting from different transactions writing to the same data can be undone.

For example, a memory region initially stores the value of "1", and is later modified to store the value of "2", then "1" is stored in the undo log and "2" is stored in the redo log. Given the initial state of "1" and based on the redo log, it can be determined that the later committed state is "2". Given the later state of "2" and the undo log, it can be determined that the earlier committed state is "1".

In some embodiments, physical memory such as 108 is represented to the processor using an indirect memory representation, where there is a level of indirection between the processor-issued physical address and the actual data line (also referred to as cache line) location in physical memory. Detailed examples of such indirect memory representation can be found in U.S. Pat. No. 8,407,428, which is incorporated herein by reference in its entirety for all purposes, and U.S. Pat. No. 7,650,460, which is incorporated herein by reference in its entirety for all purposes.

Figure 1B:
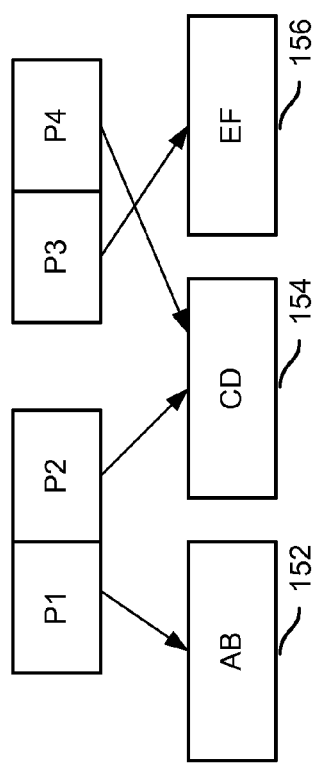
FIG. 1B is a diagram illustrating an example of an indirect memory representation.

FIG. 1B is a diagram illustrating an example of an indirect memory representation. In this example, a page in the main memory is divided into segments or lines. Some of the lines are used to store actual data content and are referred to as data lines. Some of the lines store physical line identifiers (PLIDs) that reference the data lines, and are referred to as translation lines or indirect lines. As shown, data lines 152-156 store the actual data, and physical line identifiers (PLIDs) P1-P4 reference the data lines to form memory that corresponds to appropriate data. The processor (e.g., the CPU) uses the addresses of the PLIDs, computed from the processor-issued address, as the processor-issued physical address to indirectly access the data lines referenced by the PLIDs. For example, the set of PLIDs P1 and P2 (an indirect line) references the set of data lines 152 and 154, which corresponds to the data content of "ABCD." Another set of PLIDs P3 and P4 references the set of data lines 156 and 154, which correspond to the data content of "EFCD." To access the data content of "ABCD" the processor accesses the physical addresses of the indirect line comprising PLIDs P1 and P2 and then uses these PLIDs to locate the data lines containing the data, namely the data lines corresponding to PLID1 and PLID2. In some embodiments, the memory controller facilitates data access by providing a mapping of the PLIDs to the data lines. The data structure comprising a set of PLIDs (which references a corresponding set of physical data lines comprising actual data content) is referred to as an indirect line. A write operation is equivalent to changing the PLID stored at the location in the translation line entry corresponding to the write address to a different PLID, so that a different data line is referenced.

In some embodiments, memory used to store data is organized as an array of fixed-size data lines, each addressed by a PLID. Data lines are reference counted and can be shared. In other words, there can be multiple PLIDs referencing a single data line. The size of the data lines depend on implementation and can vary in different embodiments. In some embodiments, the data lines are deduplicated (in other words, each data line has unique content, and PLIDs referencing the same data content do so by referencing the same data lines). For example, the data content "CD" is used by multiple PLIDs but only stored in a single data line.

In some embodiments, each data line is immutable. In other words, once a data line is assigned a specific value, it does not change for the duration of the application. If data needs to be written, the indirect line entry storing the PLID referencing the old data is changed to store a different PLID referencing the new data. For example, an indirect line entry initially stores PLID P1, which references data content of AB. If the data content needs to be changed to EF instead, the entry is changed to PLID P3.

Figure 1C:
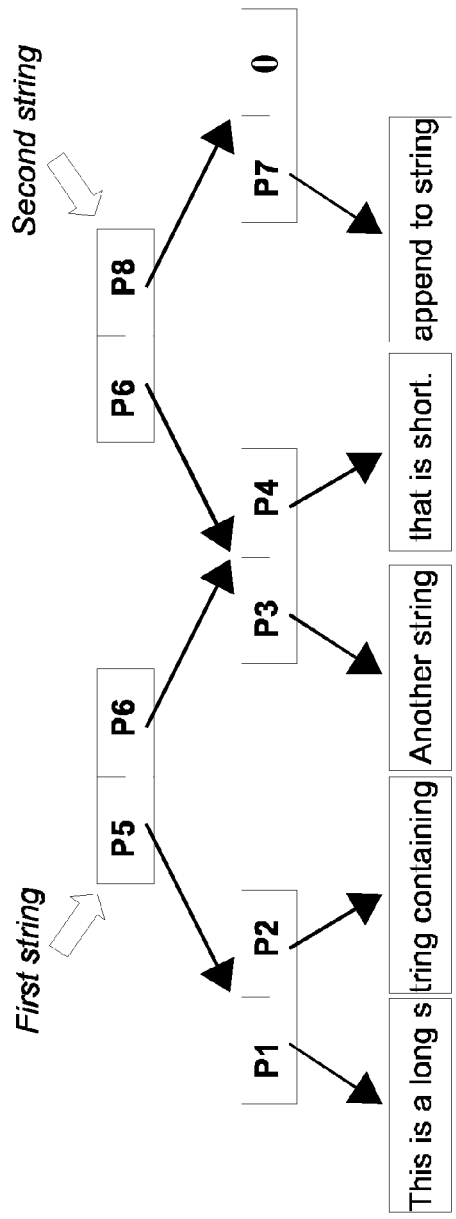
FIG. 1C is a diagram illustrating another example of an indirect memory representation

The technique described herein is generally applicable to memory that is represented using an indirect memory representation. Although an indirect memory representation similar to what is shown in FIG. 1B is discussed extensively below, other indirect memory representations can be used. FIG. 1C is a diagram illustrating another example of an indirect memory representation, where the PLIDs are organized into a Directed Acyclic Graph (DAG).

Consistent Read

Figure 2:
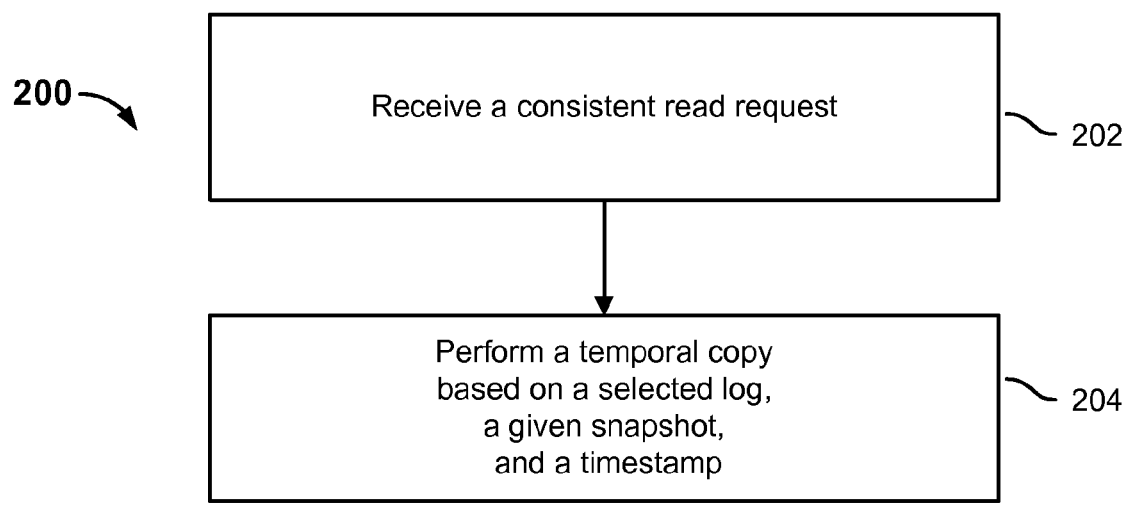
FIG. 2 is a flowchart illustrating an embodiment of a consistent read process implemented on a system such as 100 of FIG. 1A.

FIG. 2 is a flowchart illustrating an embodiment of a consistent read process implemented on a system such as 100 of FIG. 1A. In this example, process 200 is invoked by the CCP in response to a consistent read request by the CPU.

At 202, a consistent read request for a snapshot of a memory region as of a specific time is received. The consistent read request includes information about the location of the memory region of interest, and the specific point in time at which a snapshot (i.e., a copy) of the memory region is being requested. In some embodiments, the consistent read request is an instruction sent by the CPU to the CCP via the memory controller.

At 204, a temporal copy operation is performed.

In some embodiments, both undo log and redo log are used by temporal copy. In some embodiments, the temporal copy operation includes selecting the undo or redo log depending on context. In some embodiments, the log is selected before the temporal copy operation is invoked and the selected log is used by the temporal copy operation. The selection can be made by the CPU, the memory controller, the CCP itself, etc. As will be described in greater detail, the log selection depends on whether the consistent read process is used to perform an undo operation to obtain a snapshot of data in an earlier committed state, or to perform a redo operation to obtain a snapshot of data in a later committed state. In some embodiments, the log is selected according to the caller's specification; in some embodiments, the log is selected based on the time that is requested.

The temporal copy operation includes generating a snapshot based on the selected log, a known state of the memory region (e.g., an existing snapshot of the memory region in a committed state), and a timestamp associated with the snapshot. The temporal copy generates the snapshot of the memory region at the specified time. The generated snapshot of the physical memory is provided to the first processor to be used by applications executing in the first processor.

Figure 3:
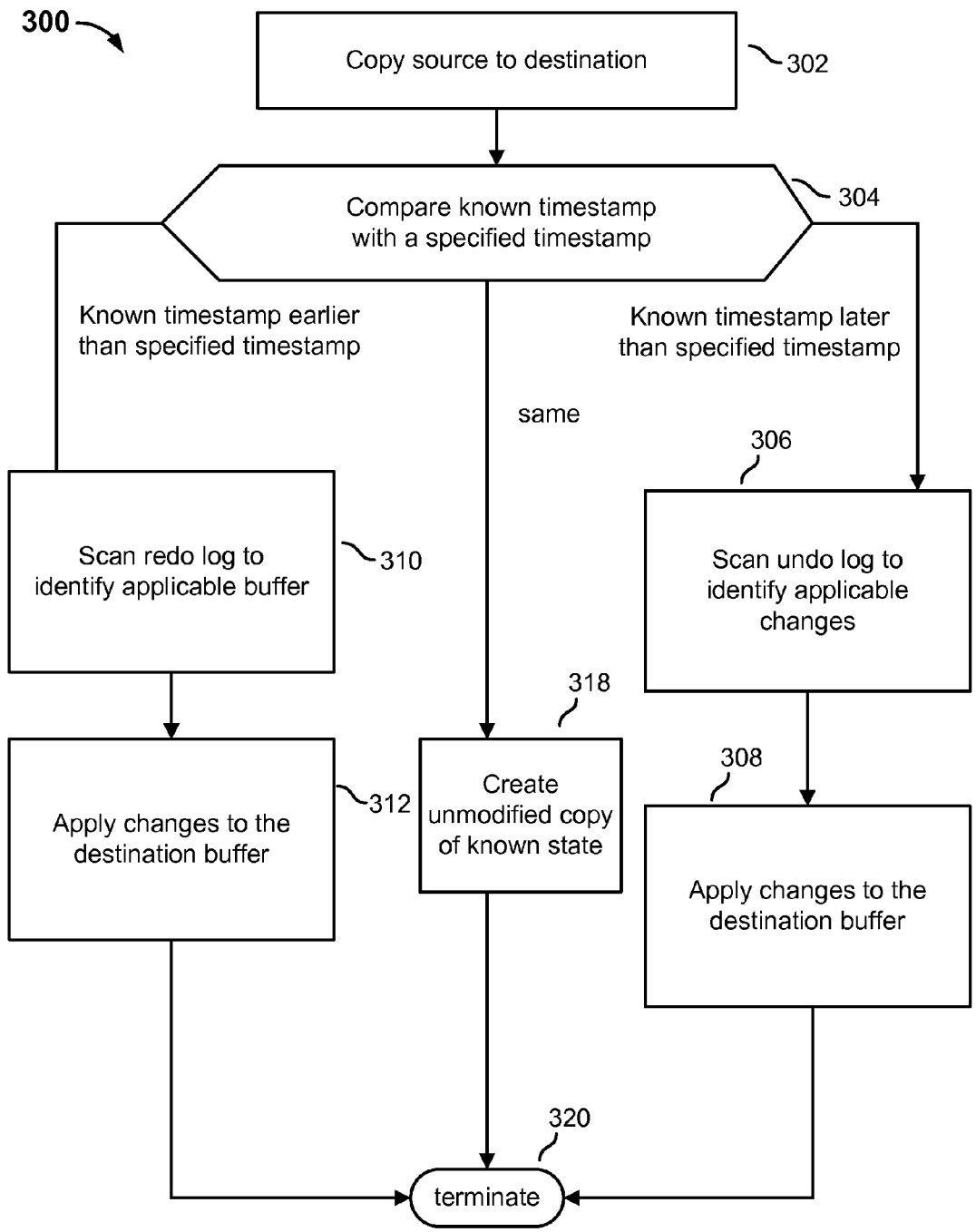
FIG. 3 is a flowchart illustrating an embodiment of a temporal copy process.

FIG. 3 is a flowchart illustrating an embodiment of a temporal copy process. Process 300 can be used to implement 204 of process 200. In this example, the temporal copy operation is specified to have the following function interface:

temporalCopy(src, dest, timestamp);

where src and dest correspond to a source memory location (e.g., a source buffer location) and a destination memory location (e.g., a destination buffer location), respectively. The function produces a buffer at location dest (e.g., physical address 0x1000000) that includes the state of the buffer at location src (e.g., 0x10001111), as of the time at the specified timestamp (e.g.: 11:00 AM, Jan. 12, 2014; 201401121100, etc.). The memory state of src is known, and the memory state of dest is to be determined. In this function interface, the known state corresponds to the state of src at the current time. In some embodiments, the function interface may provide additional parameters to specify the src state at a time other than current time, such as a time at which src is checkpointed and persisted to disk. In some embodiments, the temporal copy function is invoked by the CPU to instruct the CCP to perform the temporal copy function.

In some embodiments, the temporal copy is performed on a memory region that comprises one or more pages. In some embodiments, the memory region is independent of the page substructure. For example, the memory region may comprise a multiplicity of indirect lines (e.g., an array of PLIDs) of an indirect memory structure. For example, a memory region that is 4 kilobytes in size (the size of a conventional page) may be divided into 64 lines of 64-bytes each. If the PLIDs are 32-bit in size, then 4 translation lines each storing 16 PLIDs are used per page to reference the data lines in the region. Other memory region/data line/PLID sizes can be used in other embodiments.

In some embodiments, the src and dest designations each indicate a separate data structure that provides additional information about the source and destination memory regions themselves. For example, in some embodiments, the application specifies the src as a virtual address rather than a physical address. In such an embodiment, the separate data structure includes the operating system's virtual memory mappings, which may specify as additional information the file associated with the source region, the logs being used to undo and redo changes to this region and other properties, such as transactional behavior. The dest can be similarly specified. The operating system software translates this virtual address to a physical memory location, ensuring this physical memory location contains the content associated with this logical content and further determining the logs to be used by the temporal copy from this additional information. In another embodiment, the src is specified as a region within a logical data set. That is, it identifies a logical unit of data which may have been located at another physical address or not at any physical address at the specified time. In this case, the software implementing the data set maintains additional information that indicates where copies of the logical data are stored (e.g. in what checkpoints and caches), the logs associated with the src and further configuration parameters controlling how to instantiate the data in memory. In some embodiments, the dest parameter is omitted and the temporal copy returns an indication of the location in which the data that is the result of the temporal copy is stored.

In this example, at 302, data in the source memory location is copied to the destination memory location. In embodiments where the memory is represented using an indirect memory representation such as those shown in FIGS. 1B-1C, the copy operation includes copying the PLIDs in the translation lines. Since the actual data lines referenced by the PLIDs are not copied, the amount of data that is copied can be significantly less than all the data content in the source memory region, making the copy operation very efficient.

At 304, a known timestamp associated with a known state of the source memory location (e.g., the current time if the known state is the current state) and a specified timestamp associated with the state to be generated are compared. The result of the comparison is used to select the appropriate log. In some embodiments, the known timestamp (or the corresponding location of the entry in the log) is specified to the CCP in advance of the temporal copy operation. In some embodiments, the temporalCopy function includes one or more additional parameters that specify this information.

If the timestamps are the same (e.g., both the known state and the specified timestamp correspond to current time), the known state is the same as the specified state and there is no change. Thus, an unmodified copy of the memory region in its known state is created at 318, and the process terminates at 320.

A known timestamp that is later than the specified timestamp indicates that an earlier state of the data is to be generated by undoing changes that resulted in the data in the source memory region, and thus the undo log is selected. Accordingly, at 306, the undo log is scanned to identify committed changes that are applicable to the source memory region between the specified time and the known time. In some embodiments, the scanning starts from the latest point in the undo log that is earlier than the known timestamp (or the end of the log if current time is used as the known time), and terminates when a timestamp that is earlier than the specified time is reached in the log or when the entire log has been scanned. At 308, the changes are applied to the destination buffer in such an order that the latest change is applied first, thus undoing the changes made to the source buffer between the specified time and the known time. The resulting data in the destination buffer is the desired data as of the specified time. If no change is identified, then none is applied. The process subsequently terminates at 320.

A known timestamp that is earlier than the specified timestamp indicates that a later state of the data is to be generated by re-applying changes that occurred after the known state was committed in the source memory region, and thus the redo log is selected. Accordingly, at 310, the redo log is scanned to identify committed changes that are applicable to the source memory region between the known time and the specified time. In some embodiments, the scanning starts from the earliest point in the redo log that is later than the known timestamp, and terminates when a timestamp that is later than the specified time is reached in the log, or when the entire log has been scanned. At 312, the changes are applied to the destination buffer in such an order that the earliest change is applied first, thus reapplying the changes made to the source buffer between the known time and the specified time. If no change is identified, then none is applied. The process subsequently terminates at 320.

In some embodiments, the process optionally determines whether a copy of the memory region exists at the specified time. For example, a separate log of times the memory region is checkpointed is kept and used to determine whether a copy exists at that time, and the undo/redo logs are checked to determine whether there are further changes to the checkpointed snapshot. If a checkpointed snapshot exists and there are no changes, a logical copy of the snapshot is provided and the process of recreating the snapshot as set forth above is not invoked.

In some embodiments, the CCP is provided with the virtual-to-physical address translation information, and thereby supports a temporal copy using virtual addresses. It can further store log information using virtual rather than physical addresses.

Figure 4A:
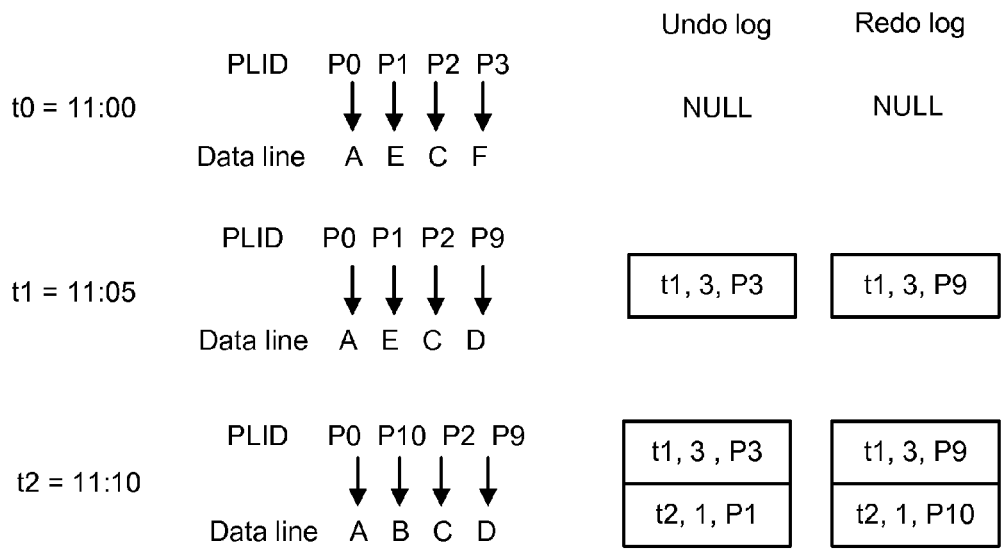
FIGS. 4A-4C are example data diagrams illustrating the data and logs used in an example consistent read process.
Figure 4B:
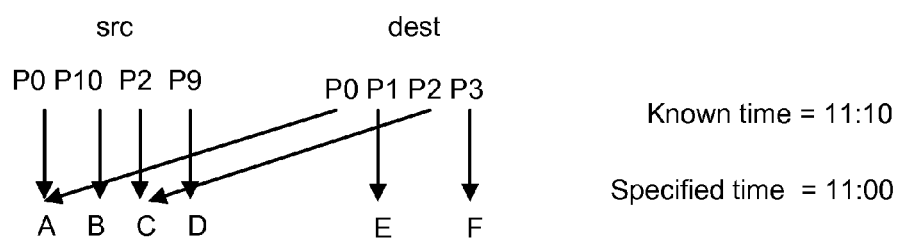
Figure 4C:
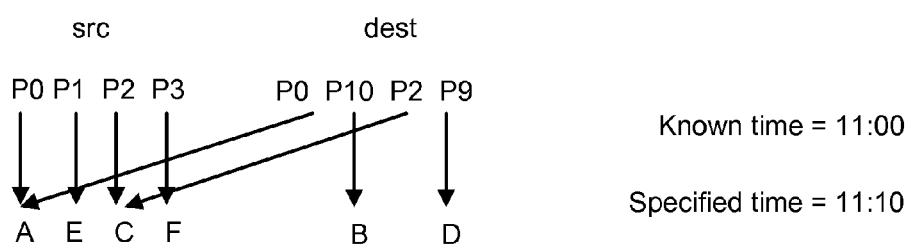

FIGS. 4A-4C are example data diagrams illustrating the data and logs used in an example consistent read process. FIG. 4A illustrates a set of data that undergoes changes within a transaction. In this example, data is stored in a structured memory. Specifically, the memory region stores an indirect line storing a set of PLIDs that references a corresponding set of data lines. Note that the values of the PLIDs can be arbitrary, and are selected to reference the first, second, third, and fourth data lines.

At t0=11:00, an indirect line stores PLIDs P0, P1, P2, and P3, which reference data lines storing A, E, C, and F, respectively. This is the initial committed state of the memory region at the beginning of the transaction. There is no entry in the undo or redo logs.

At t1=11:05, the translation line entry storing PLID P3 is modified to PLID P9, which references D instead of F. Thus, the undo log records that at time t1, the entry at an offset of 3 from the beginning of the line stores PLID P3, and the redo log records that at time t1, the entry at an offset of 3 from the beginning of the line stores PLID P9.

At t2=11:10, the translation line entry storing PLID P1 is modified to PLID P10, which references B instead of E. Thus, the undo log adds an entry specifying that at time t2, the entry at an offset of 2 from the beginning of the line stores PLID P1, and the redo log records that at time t2, the entry at an offset of 2 from the beginning of the line stores PLID 10. At this point, the transaction is ready to be committed.

In some embodiments, the changes need to be rolled back (possibly because of conflicts with other transactions). Thus, in FIG. 4B, a later snapshot is used to recover an earlier snapshot. The known time is 11:10 and the specified time is 11:00. A copy of the source state is made to a destination (i.e., a copy of the source PLIDs P0, P10, P2, and P9 is made to reference to the same data lines containing A, B, C, and D). The undo log is scanned to determine how to revert a set of destination data lines A, B, C, and D. According to the undo log shown in FIG. 4A, the second entry is reverted from P10 to P1 (so that the underlying data content of B is reverted to E), and the fourth entry is reverted from P9 to P3 (so that the data content of D is reverted to F). The reversion is performed by getting the PLID for the old value from the undo log and writing to the specified translation entry. A destination buffer that references data lines A, E, C, and F is generated.

In some embodiments, an earlier checkpointed snapshot is used to generate a later state. This is illustrated in FIG. 4C. The known time is 11:00 and the specified time is 11:10. A copy of the source PLIDs P0, P1, P2, and P3 is made at the destination. The redo log is scanned to reapply changes to a set of destination data lines A, E, C, F, where the fourth entry is changed from P3 to P9 (and the data content from F to D), and the second data line is changed from P1 to P10 (and the data content from E to B). A destination buffer of PLIDs P0, P10, P2, P9 referencing A, B, C, and D is generated.

In some embodiments, scanning of the log (306 or 310 of process 300) occurs before data in the source is copied to the destination. For each page (or subpage), a bit set corresponding to the data lines is maintained, where each bit corresponds to a line. The bit set is reset at the known time when the state of the memory region is known, such as the beginning of a transaction. If the log record indicates that a particular entry in the indirect line is changed, then the corresponding bit is marked. Only the unmarked source PLIDs are copied to the destination. The changes are still applied to derive the desired data line in the destination. To illustrate using FIGS. 4B and 4C, a bit mask of 0000 is used to represent entries 0-3 at the beginning of the transaction. At the end of the transaction, the resulting bitmask is 0101 because PLIDs referencing the second and fourth data lines changed. The source buffer's first and third data lines (PLIDs P0 and P2) are unchanged and therefore corresponding bits are unmarked. These PLIDs are copied to the corresponding positions in the destination buffer. The second and fourth entries are marked due to changes recorded in the log, and are not copied to the destination buffer's second and fourth data lines. Instead, only the changes according to the logs are copied to the corresponding positions in the destination buffer. In this example, depending on which log is used, P1 and P3 referencing data lines E and F (FIG. 4B) or P10 and P9 referencing data lines B and D (FIG. 4C) are copied to the second and fourth locations in the line.

The CCP can implement other operations as degenerate or variants of the temporal copy. In some embodiments, the CCP implements a "same time" copy of the source to the destination (i.e., a temporal copy where the specified time is the same as the known time), makes an exact copy while exploiting the PLID copy as an optimization over actually copying the data. In some embodiments, the CCP implements "clear" on a memory region as an optimized version of copying an all-zeroes source segment. In some embodiments, the CCP can implement a move on a memory region that clears each PLID in the source region as part of moving it to the destination region, thereby avoiding the overhead of reference count changes, and concurrently providing a "clear" on the source region.

Merge-Update Copy

In some embodiments, the CCP is configured to perform an atomic merge-update copy operation (also referred to as a merge-update operation). Details of this operation and its implementation are discussed in U.S. patent application Ser. No. 12/804,901, which is incorporated by reference in its entirety for all purposes. The merge-update operation allows concurrent updates to be merged even when there are conflicts from modifications by different threads or processes, so long as the conflicts are logically consistent and can be resolved to arrive at a predictable memory state.

In some embodiments, an updating process or thread maintains a copy of the original data structure at the beginning of an update operation or a logical transaction and performs updates on the copy. On completion of the updates, information (such as a pointer) associated with the original data structure is compared with information associated with the current version of the data structure. If they point to the same structure, there are no conflicting updates and a compare-and-swap (CAS) operation is performed to replace the original version with a new, modified version of the data structure. If, however, the original data structure is different from the current data structure, updates of the current data structure can be merged into the new, modified version as long as the differences are logically consistent. Logically consistent differences are concurrent modifications by different threads or processes that can be resolved to arrive at a memory state that is consistent with application semantics. When logically consistent modifications made by multiple threads to a memory structure are merged, it is as though each thread or process has made its modifications to the memory structure atomically and independently. As will be explained in greater detail below, for different types of data, there are different ways of determining whether modifications are logically consistent. In some embodiments, logical consistency is determined using logical consistency constraints selected from among a set of potential constraints. Once the differences are merged, the CAS operation is retried. If the differences are not logically consistent, such as when two current processes each attempt to add an entry to a map with the same key, the merge-update operation fails and some operations are retried.

In some embodiments, entries in the undo/redo logs correspond to the updates to a memory region by separate committed transactions between the start of the current transaction and the present time. The CCP is configured to copy the lines in a memory region that have been changed by concurrent transactions into a specified memory region, provided that the changes do not conflict with the updates by the current transaction. In some embodiments, the CCP is further configured to resolve certain logically consistent conflicts.

Figure 5:
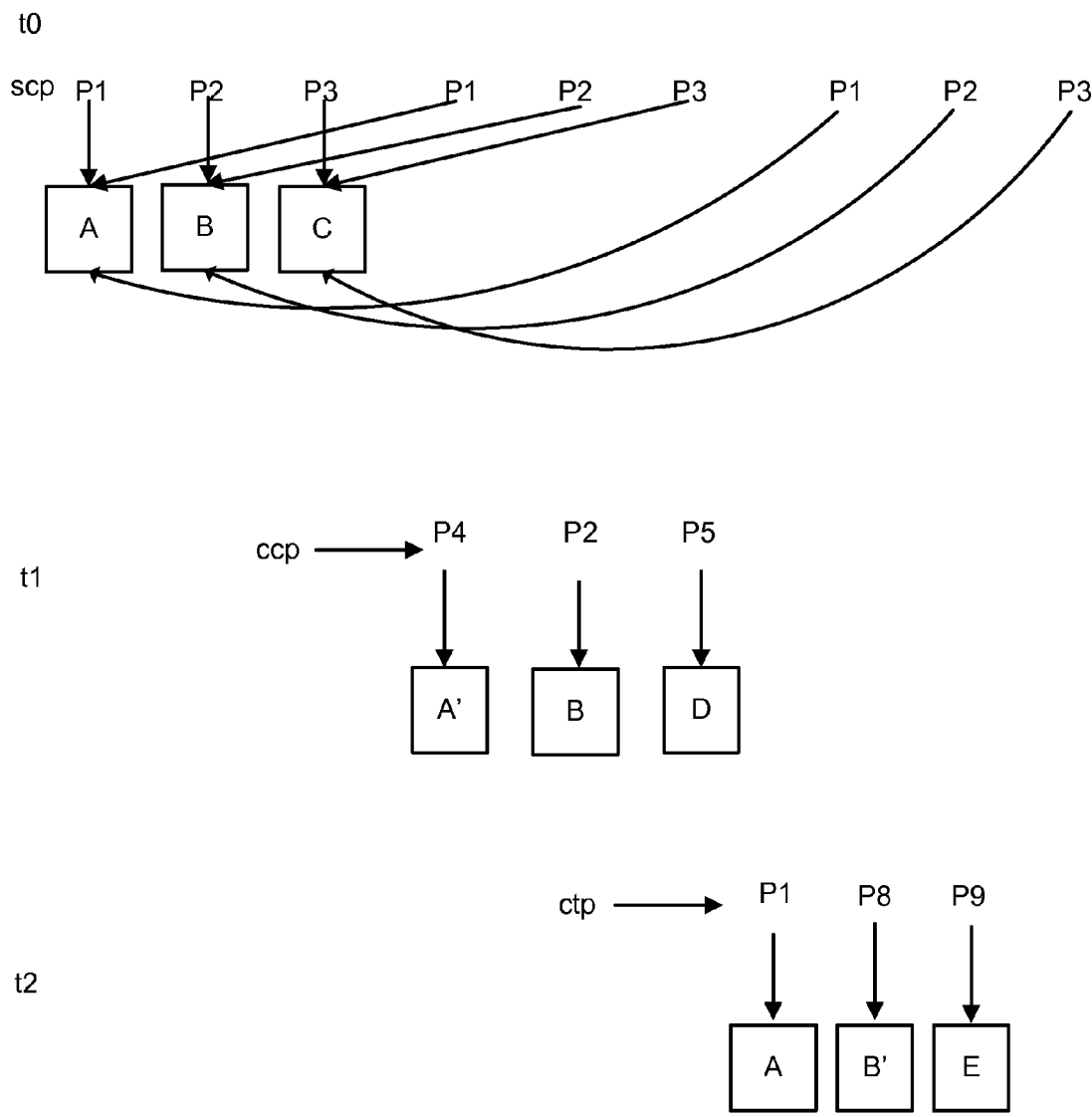
FIG. 5 is an example data diagram illustrating an embodiment of a merge-update copy process.

FIG. 5 is an example data diagram illustrating an embodiment of a merge-update copy process. Pseudo code illustrating the merge-update copy process is shown below and explained in connection with FIG. 5.

As shown in FIG. 5, at t0 (the initial state), an indirect line in a memory region comprises PLIDs P1, P2, and P3 which reference data lines A, B, and C, respectively. Two concurrent transactions have copies of snapshots of the indirect line, each making its own set of changes to its copy. During the modification, each transaction takes a snapshot of the initial state, which involves creating an indirect line copy that references the same data lines A, B, and C. Accordingly, the changes made by one transaction are not visible to the other transaction.

The first process changes the first position in the indirect line by changing PLID P1 to PLID P4, thus changing the data being referenced from A to A'. and PLID P3 to P5, thus changing the data being referenced from C to D. The changes are committed at time t1, and the indirect line formed by P4, P2, and P5 is referred to as the currently committed copy of the state.

Concurrently, the second process changes the second position in the indirect line by changing PLID P2 to PLID P8 (and data line being referenced from B to B'), and the third position by changing PLID P3 to PLID 9 (and data line being referenced from C to E). The changes made by the second transaction are not yet committed (and thus the references are indicated by dash lines), and the indirect line formed by P1, P8, and P9 is referred to as the current transaction copy of the state. At time t2 (which is later than t1), the second transaction needs to commit its changes. Because changes are made by two concurrent transactions, the changes are subject to a merge-update process.

C-style pseudo code is discussed below. In the pseudo code, the following pointers are initially specified: scp initially points to the first position of the snapshot copy, thus *scp initially references the PLID that corresponds to data line A; ccp initially points to the first position of currently committed copy of the state, thus *ccp initially references the PLID that corresponds to data line A'; and ctp initially points to the first position of the current transaction copy of the state, thus *ctp initially references the PLID that corresponds to data line A. An increment of each pointer advances the pointer to reference the PLID for the next line. The pseudo code specifies that:

```
for each position that corresponds to a data line in this memory region
    if *ccp is modified relative to *scp
        if *ctp equals *scp // so not modified by the current transaction
            write *ccp to *ctp;
        else
            //handle write-write conflict
            mergedLine=
            lineMergeUpdate(*scp,*ccp,*ctp,mergeCategory);
            if merge fails, return failure;
            write mergedLine to *ctp;
++scp; ++ccp; ++ctp;
```

Referring to FIG. 5, for the first data line, *ccp (PLID P4) is modified relative to *scp (PLID P1), but *ctp (PLID P1) equals *scp (PLID P1). Thus, this line is modified only by one transaction, and *ccp is written to *ctp (PLID P1 is changed to PLID P4).

For the second data line, *ccp (PLID P2) is not modified relative to *scp (PLID P2), thus, the line is again modified by at most one transaction and *ctp (PLID P8) is unchanged.

For the third data line, *ccp (PLID P5) is modified relative to *scp (PLID P3), and *ctp (PLID P9) is not the same as *scp (PLID P3). This is said to be a write-write conflict since two transactions both attempted to make changes to the same data. Thus, the lineMergeUpdate function is called to determine whether the write-write conflict is logically consistent, and if so, merge the conflict. The parameter mergeCategory indicates the form of merge to use. The default result of lineMergeUpdate is failure (such as the case shown in FIG. 5, where the data content of two different letters D and E results in a write-write conflict that is not logically consistent and cannot be resolved). When lineMergeUpdate fails, the current uncommitted transaction is aborted. However, certain other types of merge are permissible (i.e., the write-write conflict is logically consistent). For example, if mergeCategory indicates that the values in the data line are treated as counters, the lineMergeUpdate function will determine the difference between the snapshot copy and the current transaction value, and adds this difference to the counter in the line to provide the mergedLine that provides the semantics for resolving the conflict. The mergeCategory may also specify certain constraints. For example, with monotonic incrementing counters, the merge-update operation fails if the merged value violates the constraint that the counter value must increment monotonically, such as when the counter was reset by one of the transactions.

In this example, the memory region state of the current transaction is effectively a snapshot of the state created at time t0, modified with various updates that are to be performed at time t2 (the end time of the current transaction). The merge-update copy effectively incorporates updates that have been committed to the memory region between time t0 and time t2 by other concurrent transactions. Specifically, if the updates can be merged (i.e., if there is no conflict or if the conflict is logically consistent), they are merged. Thus, the merge-update copy operation can be implemented as a temporal copy operation for a given region with a known start time of t0 and ends at a specified time of t2. The temporal copy operation additionally detects write-write conflicts (e.g., by tracking if multiple logs from different transactions modify the same PLID location), and performs a merge operation if possible.

In some embodiments, each redo log entry includes information about the corresponding transaction that made the change, so that the merge-update copy operation can use the redo log to determine the committed modifications and perform the merge-update copy operation.

In some embodiments, a merge-update copy is invoked on transaction commit for each modified memory region of the transaction. The redo log is used to detect any commit conflicts, resolve them if possible and otherwise abort the transaction. In contrast, in existing systems, a transaction is required to make an explicit check for whether there is a write to the same location by another transaction in order to detect write-write conflicts, which incurs a lot of overhead. In a system implementing hardware-supported temporal copy, the redo log can be used to detect write-write conflicts when a transaction is to commit its changes. In some embodiments, a redo log entry includes information about which transaction made the change, and at the time a transaction is to commit its changes, applicable entries in the redo log are located and examined to determine whether conflicts exist. Identified conflicts are resolved if possible. If the conflicts are impossible to resolve, the transaction is aborted.

In some embodiments, the merge-update operation is invoked only when the same page is modified by both the current transaction and another committed concurrent transaction. This is because if a page is only modified by a single transaction, there would be no conflict and merging is not required. In some embodiments, each physical page includes metadata indicating whether it has been modified by multiple transactions, and this metadata information is used by the operating system to determine whether to invoke a merge-update operation for this physical page.

Log Representation

Figure 6A:
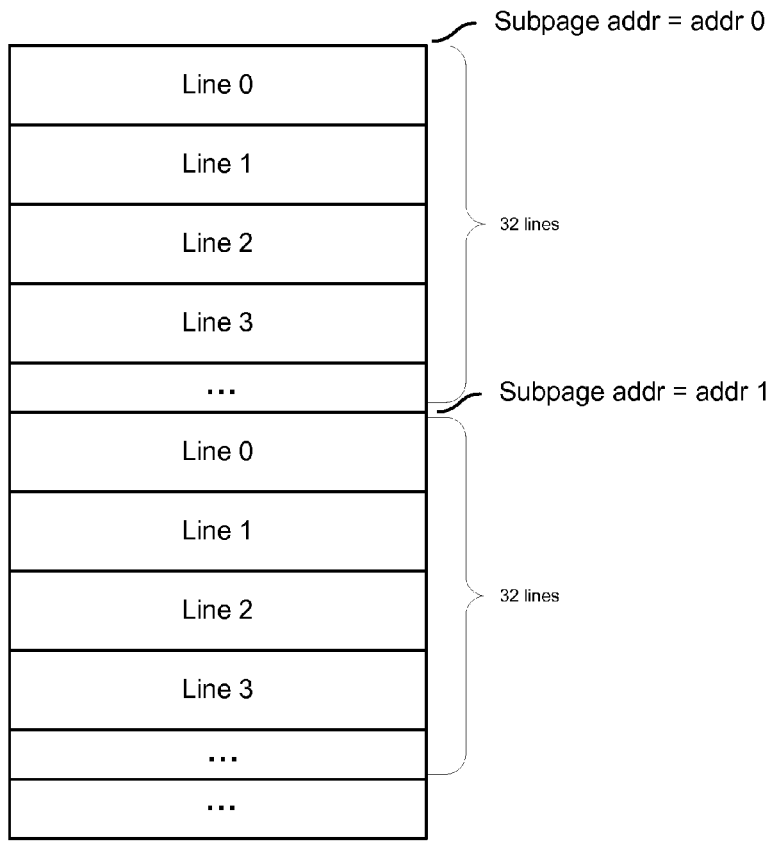
FIG. 6A is a diagram illustrating an embodiment of physical data lines in memory.

FIG. 6A is a diagram illustrating an embodiment of physical data lines in memory. As shown, the physical memory is divided into subpages. Each subpage includes a preset number of data lines (32 in this example, but other numbers can be used in other embodiments). The beginning address of the subpage is denoted as subpageAddr. A line mask can be used to represent the lines, where each bit in the line mask corresponds to a specific line.

In this example, the line mask is a 32-bit value with a bit per line in the subpage unit, with the i-th bit in the mask corresponding to the i-th line of the subpage. Initially, the line mask is set to a default value such as 0. If a line is modified, its corresponding line mask bit value is set to 1. Thus, information about the location of a particular data line and whether the PLID referencing the data line has been modified can be represented using a subpage update records (SPUR) with the following fields:
[subpageAddr,lineMask],
where subpageAddr is the address of the subpage on which the line is located, and lineMask is the line mask, which includes a bit set to indicate the modified status of the corresponding lines.

The size of the subpage is determined by the size of the lineMask times the size of a line. In an embodiment using 64-byte lines and a 32-bit lineMask, the subpage size is 2 kilobytes.

Figure 6B:
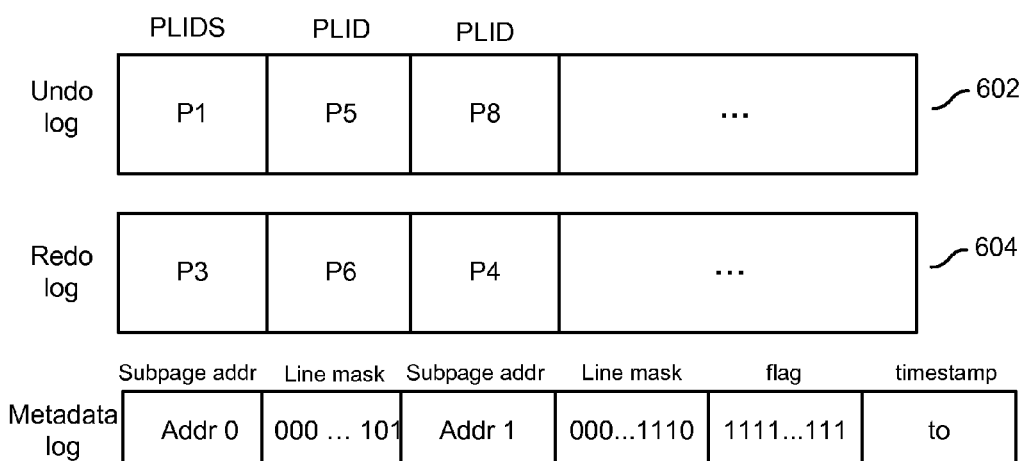
FIG. 6B is a diagram illustrating an embodiment of a log representation based on the data line representation of FIG. 6A.

FIG. 6B is a diagram illustrating an embodiment of a log representation based on the data line representation of FIG. 6A. In this example, undo log 602 is represented as a sequence of PLID values corresponding to data lines that have been overwritten. Similarly, redo log 604 is represented as a sequence of PLID values corresponding to the modified or new data lines that have been written.

Each PLID maps to a corresponding physical data line location. In this example, the physical information is stored in a metadata log 606 to conserve memory required for the log entries. Referring to FIG. 6A, on each subpage, the metadata log is represented as a sequence of SPURs. In each SPUR, the i-th bit corresponding to the i-th line on the subpage is set to a specified value (e.g., 1), indicating that the line is switched. If a line is switched, the new PLID is in the redo log and the previous PLID is in the undo log. Therefore, the same metadata log can be used to generate both undo and redo logs.

In some embodiments, the size of the subpage address and the line mask field can be further optimized, especially if the SPUR size is allowed to be other than a power of 2 bits in size. The objective of the optimization is to minimize the amount of data that is required to be scanned to perform the undo processing as part of consistent read block generation. For instance, with an 8-bit mask, each record covers 0.5 kilobytes so with a 34-bit page address field, each SPUR is 42 bits yet the addressing is able to handle 8 terabytes of memory. This selection of parameters would require memory bandwidth for log access that is roughly 70 percent of that required using a 64-bit SPUR if almost all of the updates were single-line per page. Optimization can be done based on statistics on the expected number of lines updated per page during operation.

Additional metadata information can be stored in the log by reserving a set of special addresses that indicate a SPUR is storing metadata information instead of actual page data updates. For example, a timestamp can be stored by writing a SPUR with an address that is reserved to designate a timestamp and not correspond to a subpage address (e.g., an address in which every single bit is set to 1). Such a special address is also referred to as a flag. Metadata information such as start of transaction, end of transaction, etc. can be handled similarly. By reserving a power-of-two block of addresses for each such value, the low-order bits of the page address field can be used to augment those in the mask field to store large values. For example, by using a block of 256 addresses for the time address, the low-order 8 bits of the page address can be used to augment the mask field to provide 24-bits for the timestamp in a configuration using a 16-bit line mask.

The size requirement of these parameters can be reduced by storing the value as an offset relative to some base value, rather than storing the absolute value. For example, the timestamp can be stored as an offset relative to some epoch base value. Then, the absolute timestamp can be 24-bits of offset plus 24 bits of epoch base, for a total of 48 bits of effective timestamp. The epoch base value is updated by writing a SPUR to the log with a special page address corresponding to the epoch register.

Using this representation, the CCP maintains a pointer into the undo and redo PLID logs, adjusting these pointers in reading the SPURs by the number of PLIDs indicated in the SPUR. Therefore, there is no need to explicitly store this correspondence in the log.

The fixed-size SPUR representation also allows the metadata log to be read backwards as well as forwards. This representation also facilitates easy generation of the undo/redo log by the CCP.

Logging

In some embodiments, one or more regions of physical memory of an application are designated as being logged. This can be done by the operating system or memory controller setting certain configuration registers to indicate the location and size of such a memory region. Subsequently, each write operation to a logged memory region has the written PLID copied to a log region along with a SPUR stored in the metadata log.

Figure 7:
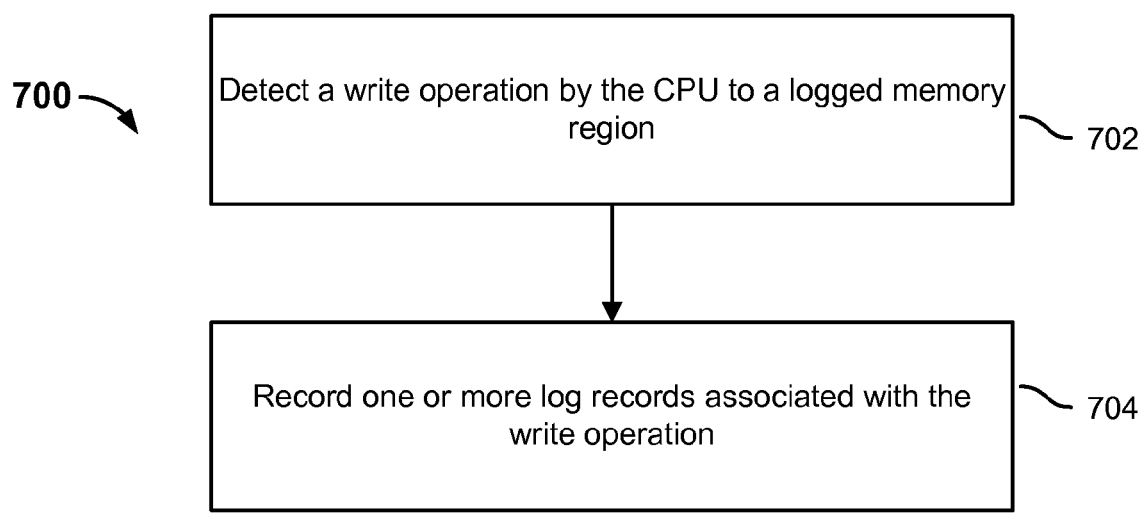
FIG. 7 is a flowchart illustrating an embodiment of a process for generating log information.

FIG. 7 is a flowchart illustrating an embodiment of a process for generating log information. Process 700 can be performed by the CCP and/or memory controller.

At 702, a write operation by the CPU to a logged physical memory region is detected. In some embodiments, a write operation to a cache or the actual underlying memory system (e.g., the main memory) is detected by logic in the memory controller and/or the CCP by checking the identifying address associated with the write operation against the logged memory regions. For a memory region represented using an indirect memory representation as discussed above, the write operation modifies an indirect representation of a physical data line (e.g., the content of a PLID or which data the PLID references to), but does not change the data content of the data line itself.

At 704, one or more log records associated with the write operation are recorded. Specifically, the old value of what got changed is recorded in the undo log, the new value is recorded in the redo log, or both values are recorded in the respective logs. In some embodiments, configuration information associated with the memory region specifies whether the undo log, the redo log, or both are updated. Identification information associated with the indirect representation of what is modified and identification information associated with the physical data line are recorded. In some embodiments, the PLID that has been modified to reference a different data line is inserted into the next entry in the appropriate log at the current (tail) position in the PLID queue. In addition, a SPUR is generated based on the data line being referenced that corresponds to the change, and is written to the metadata log.

In some embodiments, a set of undo, redo, and SPUR records is created every time a write operation occurs. Logging on each write can be inefficient, however, because the same piece of memory may be written many times. For example, if a PLID in an indirect line first references A, then B, then C, all before the transaction is committed, then only the value C is relevant for purposes of keeping track of committed memory state. Thus, in some embodiments, the log records are not created as soon as a write operation occurs, but at the time the transaction involving one or more write operations is ready to commit. A snapshot of the memory region as represented using the indirect memory structure is taken to accomplish this.

In some embodiments, taking a snapshot (copy) includes making a copy of the PLIDs that indirectly represent the memory lines in a memory region of interest. In some embodiments, the indirection in the memory access means a snapshot can be created by copying the PLIDs associated with the memory region rather than copying the actual data lines referenced by the PLIDs. In some embodiments, the CCP performs this copy of PLIDs on request as a degenerate form of the temporal copy where the specified time is the same as current time, and there is no undo or redo because nothing would be changed. The reference counting of the lines and the immutability of these shared lines means the copied PLIDs constitute a snapshot of the memory region state, even though the actual data has not been copied.

In some embodiments, a snapshot of the memory region is taken at the initial state, that is, at the beginning of the logging time interval, before the memory region is modified and subject to logging. However, taking a snapshot of the entire region can be computationally expensive. Thus, in some embodiments, the snapshots are taken on-demand, when a first write operation is detected. In some embodiments, the snapshot is generated on-demand when the first write operation is detected for the entire memory region, and no snapshot is needed if the memory region is not modified since there would be no log entry. In some embodiments, the snapshots are taken at the granularity of a subregion, such as a page. Only pages that are actually written have their snapshots taken during the logging time interval. Specifically, a first write to a page is detected and the operating system is notified to create a snapshot of the page. The operating system may invoke the CCP to aid in creating this snapshot. The snapshot of the page is created by copying the PLIDs referencing the data lines of the page to a shadow indirect structure for a page. This process is repeated for each first write to a page during the time interval of interest, with information about each write recorded in the snapshot data structure. If each PLID is 32 bits and corresponds to a line size of 64 bytes (512 bits), the amount of data copied to create a snapshot of a page could be only 1/16th the size of the page.

Accordingly, a complete snapshot of the memory region's current state is comprised of the explicitly snapshotted pages as described above and the pages from the current state that have not been modified.

In embodiments that support the snapshot technique discussed above, for a page that has been modified, the CCP can create a redo log of data lines that were switched (in other words, the PLIDs that changed which data lines are being referenced) during the logging time interval by comparing the PLIDs in the current state of the memory region to those at the corresponding offsets in the initial state snapshot, and transferring the current PLIDs that differ to the log along with the identifying information. It can similarly create an undo log by the same comparison, just saving the corresponding PLIDs from the initial state snapshot instead. In some embodiments, the time at which this operation is performed is the time at which the transaction is committed.

Take FIGS. 4A-4C as an example, the undo log and redo log can be generated using this technique. Assume that the PLIDs P0-P3 reference data lines on the same page. When a first write operation takes place on the page, a snapshot of the original page is taken, replicating the PLID values. When the log is to be generated, the PLIDs in the current state of the memory region are compared with the PLIDs in the snapshot, and the current PLIDs that differ from the PLIDs in the initial state snapshot are identified and the information saved to the logs. In addition, once the redo log is generated, the undo log can be derived by recording the corresponding entries in the redo log and their corresponding values in the snapshot. For example, referring to FIG. 4A, at 11:10, given that the redo log includes an entry at the offset of 3 from the beginning of the line (P9), and in the initial state snapshot the entry at this offset has the value of P3 it can be determined that the undo log also includes an entry at the same location, storing the value of P3. Thus, an undo log record in the indirect line can be determined based on a redo log record (which includes information about the location of the change that is logged), and the old value at the corresponding location in the initial state snapshot.

A set of example pseudo code used to append log information to the undo and redo logs at commit time is as follows:

```
for each subpage in the snapshot
    for each line i in subpage
        if the i-th PLID in the snapshot differs from i-th PLID in current
        subpage
            if redo logging, enqueue this current PLID to the redo log;
            if undo logging, enqueue this ith snapshot PLID to the undo
            log;
            record this i-th bit as set in the lineMask in the SPUR for
            this page;
        enqueue the SPUR for this subpage to the metadata log;
    end
```

In some embodiments, there is a "modified" flag maintained per PLID entry in the indirect memory structure. The flag is set when the corresponding entry is modified and can be cleared under software/hardware control. For example, the "modified" flags can be reset at the end of the transaction or the period of interest. Examples of the modified flag are described in U.S. patent application Ser. No. 13/712,878, which is incorporated herein by reference in its entirety for all purposes. In such embodiments, the CCP can create a redo log of lines that were modified by scanning PLID entries defining the memory region and only copying those PLIDs flagged as modified to the log.

In some embodiments where a snapshot is made at the beginning of a transaction, upon receiving an indication of the end of the transaction, such as the conventional prepare-to-commit indication, the CCP is given an indication to generate and append the redo and unlog information to the redo and undo logs. On completion of this logging, an end-transaction indication is written to the metadata log, including the transaction id and timestamp. In some embodiments, it is possible to abort a transaction. Thus, depending on whether the transaction is committed or aborted, an indication of commit or abort is provided. In the latter case, an indication of the start of the logging for this transaction (e.g., timestamp, log entry number) is also provided.

In some embodiments, not all data lines are reference counted. For example, data lines in an overflow area in a deduplicating memory system may actually be copied to a new line location when such a line is encountered. The PLID associated with the copied line is then stored in the log.

In various embodiments, maintaining the log beyond its initial generation and the temporal copy supported by the CCP can be done in software with minimal impact on the performance. Some of these features that can be supported in software are described below.

In some embodiments, flushing the top-level caches to cache or memory on transaction commit is implemented in software so that writes to lines as part of a transaction are logged in a timely way relative to the completion of the transaction. In some embodiments, the processor can perform this action as part of a commit instruction.

In some embodiments, at the start of an update, such as a transaction, software running in the CPU communicates a begin-transaction and at the end, an end-transaction operation to the CCP to indicate the start and end of a transaction, respectively. On indication of begin transaction, a transaction identifier is allocated and a current timestamp is recorded.

In some embodiments, the CCP directly serializes the generated log records to an external input/output (I/O) device such as the network, rather than storing these records in memory. Similarly, the CCP can also directly apply redo log records received and deserialized from an I/O device to a memory region to effectively bring the memory region's memory state forward in time to that associated with the redo log records. For example, a first computing node (e.g., a computing device) may effectively checkpoint its memory state to second computing node. Specifically, the first computing node checkpoints its memory state by taking a complete snapshot of its memory state, and sends the checkpointed memory state to a second computing node. The first computing node also uses its CCP to generate redo log records and transmit the records over a network connection to the second node, which applies these redo log records to the checkpointed state received from the first computing node, thereby maintaining a recent copy of the first node's memory state while incurring minimal network and application processing overhead.

In some cases, this efficient network copy technique is used to move a running application from one network host to another while minimizing the disruption to the running application by copying a checkpointed memory state of the application, and thereafter only copying the lines of the application state that have changed since the previous checkpointed state. In some embodiments, the logging, checkpointing and updating is performed by the CCP before network transmission into a transmit buffer to ensure that the CCP operation is not flow-controlled to match the limits of the network, especially when the network is congested.

Periodically, software may copy-translate the CCP-generated portion of the undo, redo, and/or metadata logs into its own log format, translating the line/page oriented records to conventional database form, typically then copying the result to a persistent store, such as a database, a disk, etc. An example log format has the following fields:
record identifier|transaction id|offset|old data value|new data value
where the fields correspond to an identifier of the record, the transaction that this update was performed by, the offset of the updated field in the record, the old data value for this field, and the new data value written to this field. This log representation does not use PLIDs because the data may be stored on a secondary storage which does not have access to the same physical-level indirect structure.

In some embodiments, software is used to maintain a mapping from page to buffer for the specified time so it can determine the binding of a given page to a virtual memory address or buffer as of the time of the modification. For example, if physical page P needs to be recorded as storing block B for a time period between ti to tj, software can translate the CCP-generated logging information to a form that is independent of physical memory addresses, or at least suitable for long-term persistent logging by the database management system. In some embodiments, upper level software maps the physical memory to higher level data structure and records the mapping information in the log records so that the upper level applications can more easily restore or reconstruct appropriate data using the log records. For example, software determines that a PLID that is changed corresponds to a record of an employee in a company's employee database, in particular the years of service field in the employee record. Thus, a log record is generated and translated by the software to include information indicating that the change is to the employee's years of service field. An application using the log can efficiently restore or reconstruct the employee database based on a snapshot of the employee database and the log record by changing the employee's years of service field according to the logged value.

In some embodiments, the CCP is provided with the logical block designation (LB) corresponding to a given physical page or subpage, and the CCP automatically records this information in the log.

In an embodiment, software manages the portions of the logs that are in memory and periodically flushes portions of these logs to non-volatile storage such as disk or FLASH memory to provide a persistent copy. Software managing these logs is configured to determine, when a request for a snapshot is received, whether the in-memory log buffers have the required data to undo the buffer back to the required time or forward to the desired time. If not, the required additional log data is accessed from its persistent storage location and transferred to main memory to allow the operation to be performed.

The hardware implementation of logging and its support for snapshotting avoids application overhead to perform these actions, including the cost in churning the processor cache to access the code and data associated with this logging implementation.

The hardware implementation also reduces the overhead of synchronizing with other application processes as part of the log processing (i.e., dealing with contention for the logging data structures.) The CCP can support multiple simultaneous operations by allowing a new copy operation to be initiated before previously issued one have completed, fully utilizing the memory system, thereby avoiding being a performance bottleneck beyond the performance limitations of the memory system itself.

Hardware-supported temporal copying and logging of memory has been disclosed. The indirect representation of the memory allows saving the whole line to the log at a space and time cost comparable to saving a pointer, because a reference to the line is stored in the log, not the data itself. The indirect representation of memory allows a memory snapshot to be created using a space and time-efficient way, by copying references to lines, rather than the data itself. This snapshot makes "consistent read" during the common case of read at the current time more efficient than having to apply undo to a modified state to provide the committed state. It also allows snapshots from earlier times to be saved at a lower space cost, reducing the cost of repeated consistent read transactions.

The technique also avoids having to intercede on application writes to memory which would otherwise be absorbed in the L1/L2 cache. In other words, it only depends on detecting modifications at the point that the line is written back from the processor cache, which may be forced at the end of a round or a transaction, for instance.

The technique also provides a way to determine the lines to be logged in the absence of modified tags, while avoiding writing lines to the log until the end of a logging interval. Deferring the writing of lines to the log until the end of the logging interval avoids multiple log entries as a result of multiple writes to the same line or same (sub)page, and avoids forcing writes out of the processor caches.

The technique also allows simplifying the log in the case of transactions, because the logging associated with a transaction is only written at the end of a transaction, so with presumed commit, the log need not contain log information associated with aborted transactions. In other words, the log is only written when it is highly likely, if not certain, the transaction is going to commit. (If not a distributed transaction, it can be certain.) This is feasible because the snapshot of the state makes an undo feasible without the log support.

The snapshot also allows deriving undo log information as a difference between the snapshot and the redo log.

The hardware logging technique also means that changes are ensured to be logged, even if they are performed by relatively untrusted application code. This is because the CCP operates independently from the CPU's execution, and thus even if the application code performs incorrectly, the CCP can log the information without impacting the operations of the CPU.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system comprising:
a first processor;
a memory comprising a physical memory region, the memory to provide the first processor with instructions; and
a second processor that is to:
receive, from the first processor, a request to generate a snapshot of the physical memory region as of a specified time; and
generate the snapshot of the physical memory region based at least in part on a known state of the physical memory region and log information about update activity of the physical memory region, wherein the known state of the physical memory region is associated with a known timestamp and a state to be generated of the physical memory region is associated with a specified timestamp, wherein when the known timestamp is earlier than the specified timestamp, the log information comprises a redo log, wherein when the known and specified timestamps are the same, the log information specifies an absence of change in the update activity, and wherein when the known timestamp is later than the specified timestamp, the log information comprises an undo log.

2. The system of claim 1, further comprising a memory controller that is to manage data flow to and from the memory, and wherein the second processor is integrated with the memory controller.

3. The system of claim 1, wherein the physical memory region is represented using an indirect memory representation.

4. The system of claim 1, wherein the log information includes undo log information, redo log information, or both.

5. The system of claim 1, wherein the log information includes metadata comprising a subpage address and a line mask.

6. The system of claim 1, wherein the second processor is to select an undo log or a redo log.

7. The system of claim 6, wherein the undo log is selected in an event that a known time associated with the known state is later than the specified time.

8. The system of claim 6, wherein the redo log is selected in an event that a known time associated with the known state is earlier than the specified time.

9. The system of claim 1, wherein to generate the snapshot of the physical memory region includes to perform a temporal copy operation whose function interface specifies a source memory location, a destination memory location, and the specified time.

10. The system of claim 9, wherein to perform the temporal copy operation includes to:
copy data associated with the source memory location to the destination memory location;
identify one or more applicable changes between a known time and the specified time, the identification being based on a selected log; and
apply the one or more applicable changes to the destination memory location.

11. The system of claim 9, wherein to perform the temporal copy operation includes to:
identify, based on a bit set corresponding to data lines associated with the source memory location and marking whether each data line is switched, data lines that are not marked as switched;
copy the identified data lines that are not marked as switched from the source memory location to the destination memory location; and
copy data lines that are not marked as switched according to the log information to the destination memory location.

12. The system of claim 1, wherein the second processor is to perform a merge-update copy operation.

13. The system of claim 12, wherein to perform the merge-update copy operation includes to:
provide an initial snapshot of the physical memory region to a transaction that makes changes to the initial snapshot to generate a modified snapshot;
merge updates made by another concurrent transaction to a committed state of the physical memory region between a time the initial snapshot was created and current time;
detect a write-write conflict in the modified snapshot;
determine whether the write-write conflict is logically consistent; and
merge the write-write conflict if it is logically consistent to generate a merged snapshot.

14. The system of claim 13, wherein the write-write conflict is detected based on redo log information that records changes made by a plurality of concurrent transactions.

15. The system of claim 1, wherein the log information is generated by the second processor while the first processor executes.

16. The system of claim 1, wherein to generate the snapshot of the physical memory region includes to perform a temporal copy operation from a source memory location to a destination memory location, and wherein when the known timestamp is earlier than the specified timestamp:
identify committed changes applicable to the source memory location during a time period between the known and specified timestamps based on the redo log; and
apply the identified committed changes to a destination buffer associated with the destination memory location.

17. The system of claim 1, wherein to generate the snapshot of the physical memory region includes to perform a temporal copy operation from a source memory location to a destination memory location, and wherein when the known and specified timestamps are the same, create an unmodified copy of the destination memory location.

18. The system of claim 1, wherein to generate the snapshot of the physical memory region includes to perform a temporal copy operation from a source memory location to a destination memory location, and wherein when the known timestamp is later than the specified timestamp:
identify committed changes applicable to the source memory location during a time period between the known and specified timestamps based on the undo log; and
apply the identified committed changes to a destination buffer associated with the destination memory location.

19. A method of providing a snapshot of a physical memory region as of a specified time, comprising:
sending, from a first processor to a second processor, a request to generate a snapshot of the physical memory region as of the specified time; and
generating, using the second processor, the snapshot of the physical memory region based at least in part on a known state of the physical memory region and log information about update activity of the physical memory region, wherein the known state of the physical memory region is associated with a known timestamp and a state to be generated of the physical memory region is associated with a specified timestamp, wherein when the known timestamp is earlier than the specified timestamp, the log information comprises a redo log, wherein when the known and specified timestamps are the same, the log information specifies an absence of change in the update activity, and wherein when the known timestamp is later than the specified timestamp, the log information comprises an undo log.

20. The method of claim 19, wherein the physical memory region is represented using an indirect memory representation.

21. The method of claim 19, wherein the log information includes undo log information, redo log information, or both.

22. The method of claim 19, wherein the log information includes metadata comprising a subpage address and a line mask.

23. The method of claim 19, further comprising selecting an undo log or a redo log to be used by the second processor.

24. The method of claim 19, wherein generating the snapshot of the physical memory region includes performing a temporal copy operation whose function interface specifies a source memory location, a destination memory location, and the specified time.

25. The method of claim 19, further comprising performing an atomic merge-update copy operation.

* * * * *